(12) United States Patent
Li et al.

(10) Patent No.: US 10,470,037 B2
(45) Date of Patent: Nov. 5, 2019

(54) MOBILITY MANAGEMENT METHOD, USER EQUIPMENT, AND BASE STATION

(71) Applicant: HUAWEI TECHNOLOGIES CO., LTD., Shenzhen, Guangdong (CN)

(72) Inventors: Bingzhao Li, Beijing (CN); Wei Quan, Beijing (CN); Zhenxing Hu, Shenzhen (CN); Jian Zhang, Beijing (CN); Xiaodong Yang, Shenzhen (CN); Jinhua Miao, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 6 days.

(21) Appl. No.: 15/922,295

(22) Filed: Mar. 15, 2018

(65) Prior Publication Data

US 2018/0206114 A1   Jul. 19, 2018

Related U.S. Application Data

(63) Continuation of application No. PCT/CN2015/089799, filed on Sep. 16, 2015.

(51) Int. Cl.
*H04W 8/24* (2009.01)
*H04W 36/00* (2009.01)
(Continued)

(52) U.S. Cl.
CPC ............ *H04W 8/245* (2013.01); *H04W 8/08* (2013.01); *H04W 36/0055* (2013.01);
(Continued)

(58) Field of Classification Search
CPC ......... H04W 36/0033; H04W 36/0055; H04W 36/0077; H04W 36/04; H04W 36/34;
(Continued)

(56) References Cited

U.S. PATENT DOCUMENTS

| 2011/0171915 | A1 | 7/2011 | Gomes et al. |
| 2012/0142352 | A1 | 6/2012 | Zhang et al. |
| 2013/0189971 | A1 | 7/2013 | Callender et al. |
| 2013/0294405 | A1 | 11/2013 | Radulescu et al. |

(Continued)

FOREIGN PATENT DOCUMENTS

| CN | 103229558 A | 7/2013 |
| CN | 104602295 A | 5/2015 |
| GB | 2512659 A | 10/2014 |

OTHER PUBLICATIONS

"3GPP TS 36.321 V12.6.0 3rd Generation Partnership Project; Technical Specification Group Radio Access Network; Evolved Universal Terrestrial Radio Access (E-UTRA);Medium Access Control (MAC) protocol specification(Release 12), Technical Specification, Jun. 2015, 77 pages".

(Continued)

*Primary Examiner* — Steven H Nguyen
(74) *Attorney, Agent, or Firm* — Womble Bond Dickinson (US) LLP

(57) ABSTRACT

A mobility management method, user equipment, and a network device are provided. The mobility management method includes: receiving, by user equipment UE in a connected state, a handover-free UE identifier from a network device, where the handover-free UE identifier is used to uniquely identify the UE in a handover-free state in a handover-free area, and the handover-free area includes at least two cells; entering, by the UE, the handover-free state after meeting an activation condition, where in the handover-free state, the UE stores the handover-free UE identifier and a connection context that is of the UE in the connected state, and the UE does not execute a handover procedure when the UE moves in the handover-free area; sending, by the UE, the handover-free UE identifier to the network device after the UE determines that a deactivation condition is met.

20 Claims, 7 Drawing Sheets

(51) Int. Cl.
  *H04W 76/11* (2018.01)
  *H04W 8/08* (2009.01)
  *H04W 36/04* (2009.01)
  *H04W 36/36* (2009.01)
  *H04W 36/34* (2009.01)

(52) U.S. Cl.
  CPC ....... *H04W 36/0077* (2013.01); *H04W 36/04* (2013.01); *H04W 36/36* (2013.01); *H04W 76/11* (2018.02); *H04W 36/0033* (2013.01); *H04W 36/34* (2013.01)

(58) Field of Classification Search
  CPC ....... H04W 36/36; H04W 76/11; H04W 8/08; H04W 8/245
  See application file for complete search history.

(56) References Cited

U.S. PATENT DOCUMENTS

| | | |
|---|---|---|
| 2014/0141783 A1 | 5/2014 | Xu et al. |
| 2015/0079991 A1 | 3/2015 | Koskinen et al. |
| 2016/0028554 A1* | 1/2016 | Lea ...................... H04L 12/189 370/312 |

OTHER PUBLICATIONS

"3GPP TS 36.331 V12.6.0 3rd Generation Partnership Project; Technical Specification Group Radio Access Network; Evolved Universal Terrestrial Radio Access (E-UTRA);Radio Resource Control (RRC);Protocol specification(Release 12), Technical Specification, Jun. 2015, 449 pages".

* cited by examiner

MOBILITY MANAGEMENT METHOD, USER EQUIPMENT, AND BASE STATION

CROSS-REFERENCE TO RELATED APPLICATION

This application is a continuation of International Application No. PCT/CN2015/089799, filed on Sep. 16, 2015, the disclosure of which is hereby incorporated by reference in its entirety.

TECHNICAL FIELD

Embodiments of the present invention relates to the communications field, and more specifically, to a mobility management method, user equipment, and a base station.

BACKGROUND

Mobility management is important work in a wireless mobile communications system. Generally, mobility management may include mobile network handover, cell reselection, and the like of user equipment (UE).

In a 3rd Generation Partnership Project (3GPP) Long Term Evolution (LTE)/LTE-Advanced (LTE-advanced, LTE-A) system, UE may be in an idle state or a connected state. UE in the idle state is not connected to a base station, cannot send data, and performs cell reselection during movement. The UE in the idle state first needs to enter the connected state if the UE needs to send data. The UE in the idle state may enter the connected state after obtaining connection context and a dedicated intra-cell UE identifier by using a radio resource control (RRC) connection establishment process. UE in the connected state is connected to the base station, and can send data and perform handover during movement. The UE in the connected state may enter the idle state by using an RRC connection release process.

A typical procedure of performing handover by the UE in the connected state may include the following operations: A source base station, that is, a base station currently serving the UE, configuring a measurement parameter for the UE; the UE performing measurement and reporting a measurement result to the source base station; the source base station sending a handover request to a target base station, and sending a handover command to the UE after the handover request is acknowledged by the target base station; the UE accessing the target base station, implementing uplink synchronization, and sending a handover complete message; and so on.

In future network evolution, there are increasingly more networking forms such as a heterogeneous network (Hetnet), coordinated multipoint (Coordinated Multiple Points, CoMP) transmission, small cell networking, and dense networking of small cells. These networking forms pose new challenges to UE mobility management. If the current handover procedure is still used, the UE needs to continually perform measurement and reporting. In addition, high handover signaling overheads are caused, and radio resources are wasted.

SUMMARY

Embodiments of the present invention provide a data transmission method, so as to resolve a problem that signaling and other radio resources are wasted in a current handover procedure, thereby ensuring data transmission efficiency.

A first aspect of the present invention provides a data transmission method, the method including: receiving, by user equipment UE in a connected state, a handover-free UE identifier from a network device, where the handover-free UE identifier is used to uniquely identify the UE in a handover-free state in a handover-free area, and the handover-free area includes at least two cells; entering, by the UE, the handover-free state after satisfying an activation condition, where in the handover-free state, the UE stores the handover-free UE identifier and connection context that is of the UE in the connected state, and the UE does not execute a handover procedure when the UE moves in the handover-free area; sending the handover-free UE identifier to the network device after the UE determines that a deactivation condition is met; and obtaining, by the UE, a dedicated intra-cell UE identifier of a current serving cell from the network device, and exiting the handover-free state.

According to one embodiment, the UE in the connected state can enter a handover-free state. In the handover-free state, when the connection context is retained, the UE may not execute the handover procedure when the UE moves in a handover-free area, thereby resolving a problem of frequent handover during movement of the UE. In addition, when there is a need to perform data transmission, the UE can be quickly connected to the network device by obtaining the dedicated intra-cell UE identifier, without requiring completion of an entire data access process, thereby ensuring the data transmission efficiency.

According to another embodiment, the method further includes: sending, by the UE, data to the network device according to the dedicated intra-cell UE identifier and the connection context, or receiving data from the network device according to the dedicated intra-cell UE identifier and the connection context.

According to another embodiment, an activation condition includes at least one of the following conditions: the UE receives a command of the network device, where the command is used to instruct the UE to enter the handover-free state; or the UE has not performed data transmission with the network device within a predefined time.

According to one embodiment, the UE determines that a deactivation condition is met including at least one of the following:

(1) the UE receives a handover-free area identifier sent by the network device, where the handover-free area identifier is used to identify a corresponding handover-free area, and the UE determines, according to the handover-free area identifier, that the UE has moved beyond the original handover-free area in which the UE is located;

(2) the UE listens to a paging channel, and receives, according to the handover-free UE identifier, a paging message sent by the network device on the paging channel, and the UE determines, according to the paging message, that the UE needs to perform data transmission with the network device;

(3) a target serving cell and the current serving cell of the UE are located in different tracking areas when the UE moves between cells in the handover-free area and performs cell reselection according to a cell reselection rule; or (4) the UE needs to send uplink data.

According to another embodiment, the sending, by the UE, the handover-free UE identifier to the network device includes: sending, by the UE, a random access preamble to the network device; receiving, by the UE, a transmission resource and a temporary intra-cell UE identifier that are allocated by the network device; and sending, by the UE, the handover-free UE identifier to the network device by using the transmission resource; and the obtaining, by the UE, a dedicated intra-cell UE identifier of a current serving cell from the network device includes: receiving, by the UE, a fed back handover-free UE identifier from the network device according to the temporary intra-cell UE identifier; and obtaining, by the UE, the dedicated intra-cell UE identifier according to the fed back handover-free UE identifier and the temporary intra-cell UE identifier.

According to another embodiment, when the UE determines that a deactivation condition is met including that the UE receives a handover-free area identifier sent by the network device, where the handover-free area identifier is used to identify a corresponding handover-free area, and the UE determines, according to the handover-free area identifier, that the UE has moved beyond the original handover-free area in which the UE is located, the sending, by the UE, the handover-free UE identifier to the network device using the transmission resource includes: sending, by the UE, the handover-free UE identifier and the handover-free area identifier of the original handover-free area of the UE to the network device using the transmission resource.

According to another embodiment, the obtaining, by the UE, the dedicated intra-cell UE identifier according to the fed back handover-free UE identifier and the temporary intra-cell UE identifier includes: determining, by the UE, whether the fed back handover-free UE identifier is the same as the handover-free UE identifier of the UE that is sent by the UE; and if the two identifiers are the same, using the temporary intra-cell UE identifier as the dedicated intra-cell UE identifier; or if the two identifiers are different, repeating the operation of sending a preamble to the network device until a fed back handover-free UE identifier is received from the network device, determining again whether the fed back handover-free UE identifier is the same as the handover-free UE identifier of the UE that is sent by the UE, and when the fed back handover-free UE identifier is the same as the handover-free UE identifier sent by the UE to the network device, using the obtained temporary intra-cell UE identifier as the dedicated intra-cell UE identifier.

According to another embodiment, the method further includes: receiving, by the UE, a resource identifier index from the network device, where the resource identifier index is used for receiving, after the UE exits the handover-free state, a resource that is allocated by the network device and that is used for data transmission.

According to another embodiment, the UE stops using a secondary carrier in the handover-free state.

A second aspect of the present invention provides a data transmission method, including: sending, by a network device, a handover-free UE identifier to UE in a connected state, where the handover-free UE identifier is used to uniquely identify the UE in a handover-free state in a handover-free area, the handover-free state means that the UE does not execute a handover procedure when the UE moves in the handover-free area, and the handover-free area includes at least two cells; storing, by the network device, connection context of the UE after determining, according to an activation condition, that the UE enters the handover-free state; receiving, by the network device, the handover-free UE identifier sent by the UE; and sending, by the network device, a dedicated intra-cell UE identifier of a current serving cell of the UE to the UE, so that the UE exits the handover-free state after obtaining the dedicated intra-cell UE identifier.

According to one embodiment, after the UE enters the handover-free state, the network device does not need to frequently participate in a handover procedure during movement of the UE, thereby saving communications resources of the network device. When there is a need to perform data communication with the UE, the network device may search for the UE via paging, so that the UE can be quickly connected to the network device after obtaining the dedicated intra-cell UE identifier, thereby ensuring the data transmission efficiency.

With reference to the second aspect, in a first possible implementation, the method further includes: receiving, by the network device according to the dedicated intra-cell UE identifier and the connection context, data sent by the UE, or sending data to the UE according to the dedicated intra-cell UE identifier and the connection context.

According to another embodiment, the activation condition includes at least one of the following conditions: the network device sends a command to the UE, to instruct the UE to enter the handover-free state; or the network device has not performed data transmission with the UE within a predefined time.

According to another embodiment, in a third possible implementation, the receiving, by the network device, the handover-free UE identifier sent by the UE includes: receiving, by the network device, a random access preamble sent by the UE; sending, by the network device, a transmission resource and a temporary intra-cell UE identifier to the UE; and receiving, by the network device, the handover-free UE identifier that is sent by the UE by using the transmission resource; and the sending, by the network device, a dedicated intra-cell UE identifier to the UE includes: sending, by the network device, a fed back handover-free UE identifier, where the dedicated intra-cell UE identifier is obtained by the UE according to the fed back handover-free UE identifier and the temporary intra-cell UE identifier.

According to another embodiment, the method further includes: sending, by the network device, a handover-free area identifier to the UE, where the handover-free area identifier is used to identify a corresponding handover-free area; and the receiving, by the network device, the handover-free UE identifier that is sent by the UE by using the transmission resource includes: receiving, by the network device, the handover-free UE identifier and the handover-free area identifier that are sent by the UE by using the transmission resource.

According to another embodiment, in a fifth possible implementation, the method further includes: sending, by the network device, a resource identifier index to the UE, where the resource identifier index is used to allocate a resource that is used for data transmission after the UE enters the connected state.

A third aspect of the present invention provides UE, the UE including: a receiving unit, configured to receive a handover-free UE identifier from a network device when the UE is in a connected state. The handover-free UE identifier is used to uniquely identify UE in a handover-free state in a handover-free area, and the handover-free area includes at least two cells. The UE further includes a processing unit, configured to instruct, after an activation condition is met, the UE to enter the handover-free state. While in the handover-free state, the UE does not execute a handover procedure when the UE moves in the handover-free area. The UE further includes a storage unit, configured to: in the handover-free state of the UE, store the handover-free UE identifier of the UE and connection context that is of the UE in the connected state. The UE further includes a sending unit, configured to send the handover-free UE identifier to the network device after the UE meets a deactivation condition. The receiving unit is further configured to obtain a dedicated intra-cell UE identifier of a current serving cell from the network device. The processing unit is further configured to enable the UE to exit the handover-free state after the dedicated intra-cell UE identifier is received.

According to one embodiment, the sending unit is further configured to send data to the network device according to the dedicated intra-cell UE identifier and the connection context; or the receiving unit is further configured to receive data from the network device according to the dedicated intra-cell UE identifier and the connection context.

According to another embodiment, an activation condition includes that the receiving unit receives a command of the network device, where the command is used to instruct the UE to enter the handover-free state.

According to another embodiment, the user equipment further includes a timing unit, configured to perform timing, to obtain a period of time for which the UE has stopped data transmission with the network device, where the processing unit is further configured to determine whether the period of time is greater than or equal to a predefined time, and when the period of time is greater than or equal to the predefined time, consider that the activation condition is met.

According to another embodiment, that the UE meets a deactivation condition includes at least one of the following: the receiving unit receiving a handover-free area identifier sent by the network device, where the handover-free area identifier is used to identify a corresponding handover-free area, and the processing unit determining, according to the handover-free area identifier, that the UE has moved beyond the original handover-free area in which the UE is located; the receiving unit listening to a paging channel, and receiving, according to the handover-free UE identifier, a paging message sent by the network device on the paging channel, and the processing unit determining, according to the paging message, that the UE needs to perform data transmission with the network device; when the processing unit instructs the UE to move between cells in the handover-free area and perform cell reselection according to a cell reselection rule, the processing unit determining that a target serving cell and the current serving cell of the UE are located in different tracking areas; or the sending unit needs to send uplink data.

According to another embodiment, the sending unit sending the handover-free UE identifier to the network device includes: sending, by the sending unit, a random access preamble to the network device; receiving, by the receiving unit, a transmission resource and a temporary intra-cell UE identifier that are allocated by the network device; and sending, by the sending unit, the handover-free UE identifier to the network device by using the transmission resource. The receiving unit obtaining a dedicated intra-cell UE identifier of a current serving cell from the network device includes: receiving, by the receiving unit, a fed back handover-free UE identifier from the network device according to the temporary intra-cell UE identifier; and obtaining, by the processing unit, the dedicated intra-cell UE identifier according to the fed back handover-free UE identifier and the temporary intra-cell UE identifier.

According to another embodiment, the UE meeting a deactivation condition includes the receiving unit receiving a handover-free area identifier sent by the network device. The handover-free area identifier is used to identify a corresponding handover-free area. The processing unit determines, according to the handover-free area identifier, that the UE has moved beyond the original handover-free area in which the UE is located. The sending unit sending the handover-free UE identifier to the network device using the transmission resource includes: sending, by the sending unit, the handover-free UE identifier and the handover-free area identifier of the original handover-free area of the UE to the network device using the transmission resource.

According to another embodiment, the obtaining, by the processing unit, the dedicated intra-cell UE identifier according to the fed back handover-free UE identifier and the temporary intra-cell UE identifier includes: determining, by the processing unit, whether the fed back handover-free UE identifier is the same as the handover-free UE identifier of the UE that is sent by the UE; and if the two identifiers are the same, using the temporary intra-cell UE identifier as the dedicated intra-cell UE identifier; or if the two identifiers are different, controlling, by the processing unit, the sending unit, the receiving unit, and the processing unit to repeat the operations of sending the preamble to receiving the fed back handover-free UE identifier, determining again whether the fed back handover-free UE identifier is the same as the handover-free UE identifier of the UE that is sent by the UE, and when the fed back handover-free UE identifier is the same as the handover-free UE identifier sent by the UE to the network device, using the obtained temporary intra-cell UE identifier as the dedicated intra-cell UE identifier.

According to another embodiment, the receiving unit is further configured to: receive a resource identifier index from the network device, and use the resource identifier index to receive, after the UE exits the handover-free state, a resource that is allocated by the network device and that is used for data transmission.

According to another embodiment, the processing unit is further configured to control, in the handover-free state, the sending unit and the receiving unit to stop using a secondary carrier.

A fourth aspect of the present invention provides a network device, including: a sending unit, configured to send a handover-free UE identifier to UE in a connected state, where the handover-free UE identifier is used to uniquely identify the UE in a handover-free state in a handover-free area. The handover-free state means that the UE does not execute a handover procedure when the UE moves in the handover-free area, and the handover-free area includes at least two cells. The network device further includes a processing unit, configured to determine, according to an activation condition, that the UE enters the handover-free state and a mobility anchor, configured to store connection context of the UE after it is determined that the UE enters the handover-free state. The network device further includes a receiving unit, configured to receive the handover-free UE identifier sent by the UE, where the sending unit is further configured to send a dedicated intra-cell UE identifier of a current serving cell of the UE to the UE, so that the UE exits the handover-free state after obtaining the dedicated intra-cell UE identifier.

According to one embodiment, the receiving unit is further configured to receive, according to the dedicated intra-cell UE identifier and the connection context, data sent by the UE; or the sending unit is further configured to send data to the UE according to the dedicated intra-cell UE identifier and the connection context.

According to another embodiment, the activation condition includes that the sending unit sends a command to the UE, to instruct the UE to enter the handover-free state.

According to another embodiment, the network device further includes a timing unit, configured to perform timing, to obtain a period of time for which the network device has stopped data transmission with the UE, where the processing unit is further configured to determine whether the period of time is greater than or equal to a predefined time, and when the period of time is greater than or equal to the predefined time, consider that the activation condition is met.

According to another embodiment, the receiving unit receiving the handover-free identifier sent by the UE includes: receiving, by the receiving unit, a random access preamble sent by the UE; sending, by the sending unit, a transmission resource and a temporary intra-cell UE identifier to the UE; and receiving, by the receiving unit, the handover-free UE identifier that is sent by the UE using the transmission resource. In one embodiment, sending unit sending the dedicated intra-cell UE identifier to the UE includes: sending, by the sending unit, a fed back handover-free UE identifier.

According to another embodiment, the sending unit sending a handover-free area identifier to the UE, where the handover-free area identifier is used to identify a corresponding handover-free area; and the receiving, by the receiving unit, the handover-free UE identifier that is sent by the UE by using the transmission resource includes: receiving, by the receiving unit, the handover-free UE identifier and the handover-free area identifier that are sent by the UE using the transmission resource.

According to another embodiment, the sending unit sends a resource identifier index to the UE, where the resource identifier index is used to allocate a resource that is used for data transmission after the UE enters the connected state.

In conclusion, in the embodiments of the present invention, the handover-free state is designed. In this way, when the connection context is retained, the UE in the handover-free state may not execute the handover procedure when the UE moves in the handover-free area, thereby resolving a problem of frequent handover during movement of the UE. In addition, when needing to perform data transmission, the UE can be quickly connected to the network device, thereby ensuring data transmission efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the embodiments of the present invention.

It should be understood that, the technical solutions of the embodiments of the present invention may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS).

It should further be understood that, in the embodiments of the present invention, a base station may be a base transceiver station (BTS) in GSM or CDMA, may be a NodeB (NB) in WCDMA, or may be an evolved NodeB (Evolutional Node B, eNB, or eNodeB) in LTE, a base station device in a future 5G network, or the like. This is not limited in the present invention.

It should further be understood that, the UE in the embodiments of the present invention may communicate with one or more core networks by using a radio access network (RAN), and the UE may be referred to as an access terminal, a terminal device, a subscriber unit, a subscriber station, a mobile station, a remote station, a remote terminal, a mobile device, a user terminal, a terminal, a radio communications device, a user agent, or a user apparatus. The UE may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, or a terminal device in a future 5G network.

Figure 1:
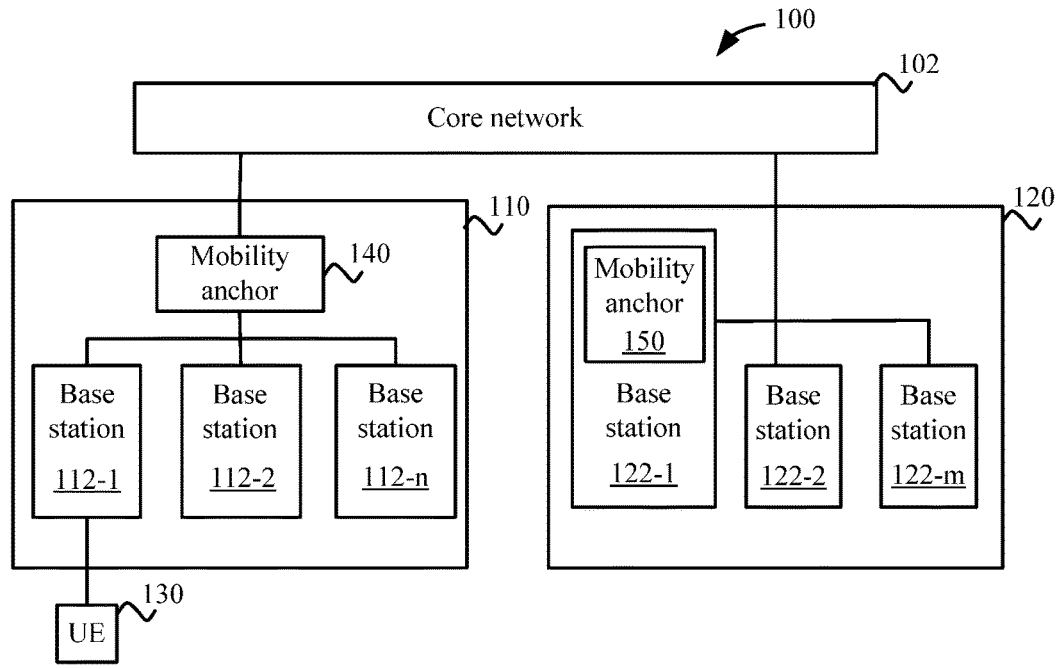
FIG. 1 is a schematic diagram of an application scenario according to an embodiment of the present invention.

FIG. 1 is a schematic diagram 100 of an application scenario according to an embodiment of the present invention. As shown in FIG. 1, the application scenario 100 includes a core network 102, a handover-free device 110, a handover-free device 120, and user equipment (UE) 130.

As shown in FIG. 1, the handover-free device 110 includes n base stations 112-1, 112-2, . . . , and 112-*n* and a mobility anchor 140, where n is a natural number greater than 0. The handover-free device 120 includes m base stations 122-1, 122-2, . . . , and 122-*m*, and a mobility anchor 150 is integrated in the base station 122-1, where m is a natural number greater than 0. It should be understood that the mobility anchor may be a logical entity and may be implemented by an independent server, for example, the mobility anchor 140 in the handover-free device 110, or may be integrated in any one of the base stations 122-1, 122-2, ..., or 122-*m*, for example, the mobility anchor 150 in the handover-free device 120.

Figure 2:
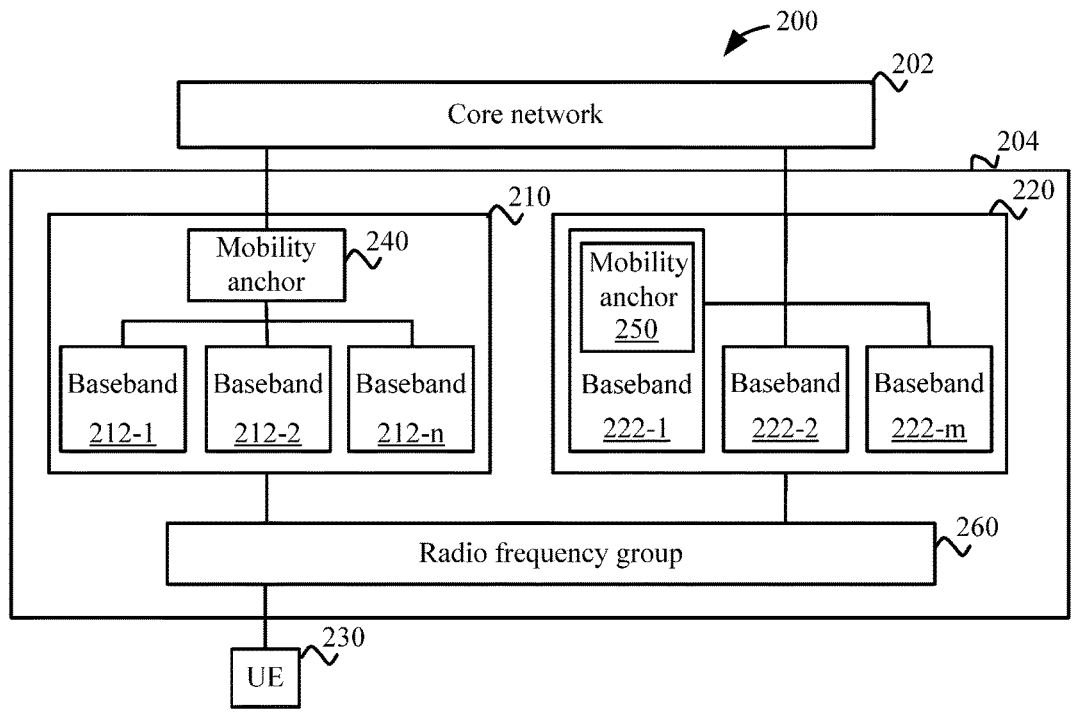
FIG. 2 is a schematic diagram of another application scenario according to an embodiment of the present invention.

FIG. 2 is a schematic diagram 200 of another application scenario according to an embodiment of the present invention. The application scenario 200 may be implemented based on a cloud radio access network (Cloud RAN) technology. In the cloud RAN technology, a radio frequency and a baseband of a base station are separated for each cell. Basebands of some cells are centralized at a physical location, that is, in a baseband pool, and radio frequencies are centrally deployed at a remote end, to form a radio frequency group. According to such an architecture, cells centralized in a same baseband pool can share hardware and information, thereby facilitating resource coordination. As shown in FIG. 2, the application scenario 200 includes a core network 202, a cloud radio access network 204, and UE 230. The cloud radio access network 204 includes baseband pools 210 and 220 and a radio frequency group 260. The baseband pool 210 includes basebands 212-1, 212-2, ..., and 212-*n* and a mobility anchor 240, where n is a natural number greater than 0. The baseband pool 220 includes m basebands 222-1, 222-2, ..., and 222-*m*, and a mobility anchor 250 is integrated on the baseband 222-1. Similarly, the mobility anchor may be a logical entity and may be implemented by an independent server, for example, the mobility anchor 240 in the baseband pool 210, or may be integrated on any one of the basebands 222-1, 222-2, ..., or 222-*n*, for example, the mobility anchor 250 in the baseband pool 220.

A network device based on the cloud RAN may correspond to a baseband pool and a radio frequency group. For example, the baseband pool 210 and the radio frequency group 260 may be used as a handover-free device, and the baseband pool 220 and the radio frequency group 260 may be used as another handover-free device. During implementation, one handover-free area may correspond to cells corresponding to all basebands included in a baseband pool. The concept of the handover-free area is to be described in FIG. 3.

It should be understood that in the embodiments of the present invention, network side devices communicating with UE are collectively referred to as a network device. A network device may include the core network, the handover-free devices, the mobility anchors, the base stations, the basebands, and/or the radio frequency group in the application scenarios shown in FIG. 1 and FIG. 2, or may include another device that communicates with the UE in another application scenario by using a network and that can implement functions in the embodiments of the present invention.

Figure 3:
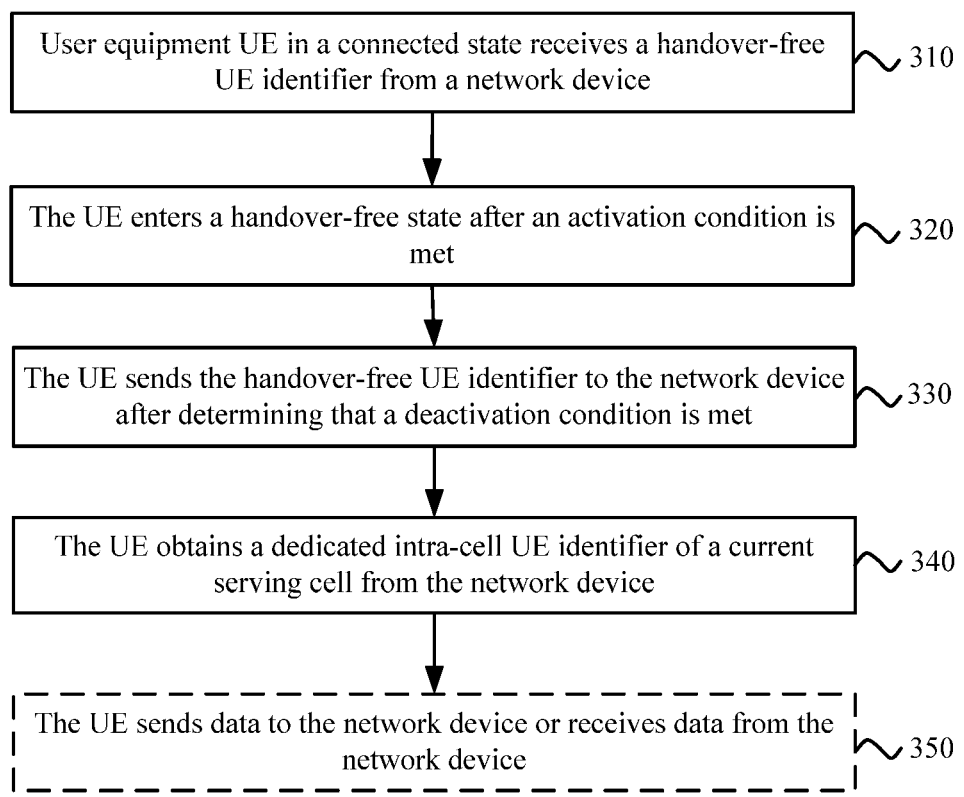
FIG. 3 is a flowchart of a mobility management method according to an embodiment of the present invention.

FIG. 3 is a schematic flowchart of a mobility management method according to an embodiment of the present invention. The method shown in FIG. 3 is performed by UE.

Referring to FIG. 3, in operation 310, UE in a connected state receives a handover-free UE identifier, for example, an HFA-RNTI (Handover Free Area—Radio Network Temporary Identifier, handover-free area—radio network temporary identifier) from a network device, where the handover-free UE identifier is used to uniquely identify the UE in a handover-free state in a handover-free area, and the handover-free area includes at least two cells.

The concepts of the handover-free state and the handover-free area are to be described with reference to operation 320.

In operation 320, the UE enters the handover-free state after an activation condition is met. In the handover-free state, the UE stores the handover-free UE identifier and connection context that is of the UE in the connected state, and does not execute a handover procedure when the UE moves in the handover-free area.

Optionally, in an embodiment, the activation condition includes: a command sent by the network device is received, where the command is used to instruct the UE to enter the handover-free state.

Optionally, in another embodiment, the activation condition includes: the UE has not performed data transmission with the network device within a predefined period of time. For example, a timer may be disposed inside the UE. After the UE receives the handover-free UE identifier HFA-RNTI, when the UE stops data transmission with the network device, the timer starts timing. If the UE performs data transmission with the network device during timing, the timer stops timing, and restarts timing after completion of the data transmission. If the UE has not performed data transmission with the network device before the timer expires, the UE enters the handover-free state after the timer expires.

Optionally, in the handover-free state, the timer stops timing, for example, is set to an initial state or a timeout state. The data transmission performed by the UE with the network device includes: sending data to the network device and/or receiving data from the network device.

Optionally, in an embodiment, each handover-free area has a handover-free area identifier, so that the UE and/or the network device determine/determines a handover-free area. The unique handover-free area identifier may be locally unique, for example, unique in a tracking area or in a public land mobile network (PLMN), or may be globally unique. A cell in the handover-free area broadcasts, in system information, a handover-free area identifier of the handover-free area to which the cell belongs, so that the UE can determine, after receiving broadcasting of the current serving cell, a handover-free area in which the UE is currently located. For example, when entering the handover-free state, the UE receives broadcasting of a current serving cell, and stores a handover-free area identifier of a handover-free area to which the cell belongs, and the UE determines, according to a handover-free area identifier broadcast by the current serving cell and the handover-free area identifier stored in the UE, whether the UE has moved beyond a handover-free area.

Optionally, in an embodiment, in the handover-free state, when moving in the handover-free area, the UE may change a serving cell based on measurement and does not notify the network device. For example, when moving between cells in the handover-free area after entering the handover-free state, the UE performs cell reselection according to a cell reselection rule. That is, the UE may determine a target serving cell and does not notify the network device. For example, when finding a cell having higher signal quality or higher signal strength, the UE may use the cell as the target serving cell. Optionally, when the UE is in the connected state, the UE registers a tracking area of the UE with the network device. For example, the UE may send a serving cell that is of the UE and that is currently in the connected state to the network device, and receive a tracking area accordingly allocated by the network device.

Optionally, in an embodiment, the UE listens to a paging channel when the UE is in the handover-free state, and receives a paging message that is for the UE from the network device according to the handover-free UE identifier HFA-RNTI. For example, when the UE in the handover-free state needs to be paged, the network device performs paging in all cells in the handover-free area in which the UE is located. The UE learns, by listening to the paging channel, that the network device pages the UE. For example, the UE may obtain a paging message and determine, according to a UE identifier carried in the paging message, whether the UE is paged. The UE identifier may include an intra-cell UE identifier of the UE in the connected state, for example, a cell radio network temporary identifier (C-RNTI), and the handover-free UE identifier HFA-RNTI of the UE in the handover-free state. If the paging message received by the UE carries the handover-free UE identifier HFA-RNTI, the UE determines whether the handover-free UE identifier HFA-RNTI is the same as that of the UE. If the two identifiers are the same, the UE considers that the UE is paged. The network device may page the UE because the network device needs to perform data transmission with the UE or another UE calls the UE.

Optionally, in an embodiment, after the UE enters the handover-free state, if multiple carriers are configured, the UE stops using all secondary carriers. Stopping using a secondary carrier includes deleting secondary carrier context, or retaining secondary carrier context but stopping listening to a downlink secondary carrier channel. At the same time, the UE keeps paging and listening to a primary carrier.

In one embodiment, the UE may enter the handover-free state according to the received UE identifier in the handover-free area after the activation condition is met. In the handover-free state, the UE stores the handover-free UE identifier and the connection context that is of the UE in the connected state, and does not execute the handover procedure when the UE moves in the handover-free area.

In operation 330, the UE sends the handover-free UE identifier to the network device after determining that a deactivation condition is met.

Optionally, that the UE determines that a deactivation condition is met includes at least one of the following:

the UE receiving a handover-free area identifier sent by the network device, where the handover-free area identifier is used to identify a corresponding handover-free area, and the UE determining, according to the handover-free area identifier, that the UE moves beyond the original handover-free area in which the UE is located;

the UE listening to a paging channel, and receives, according to the handover-free UE identifier, a paging message sent by the network device on the paging channel, and the UE determining, according to the paging message, that the UE needs to perform data transmission with the network device;

a target serving cell and the current serving cell of the UE being located in different tracking areas when the UE moves between cells in the handover-free area and performs cell reselection according to a cell reselection rule; or the UE needing to send uplink data.

Optionally, the sending, by the UE, the handover-free UE identifier to the network device includes some or all of the following several operations. In one embodiment, the following operations are included.

Operation 330-1: The UE sends a random access preamble to the network device, to request the network device to allocate a transmission resource and a dedicated intra-cell UE identifier of the current serving cell to the UE.

Because the preamble is a public resource and several UEs may use the same preamble to send a request to the network device, after receiving the preamble, the network device cannot identify specific UE that sends the preamble.

Operation 330-2: The UE receives the transmission resource and the temporary intra-cell UE identifier that are allocated by the network device. For example, the UE may receive a resource allocation command from the network device. The command may be used to notify the UE of an available uplink transmission resource, and carry the allocated temporary intra-cell UE identifier.

Because the transmission resource and a random intra-cell UE identifier that are received by the UE are not sent by the network device uniquely to the current UE, the temporary intra-cell UE identifier needs to be further verified before being used as an intra-cell UE identifier of the UE.

Optionally, the uplink transmission resource may be a time-domain and/or frequency-domain resource.

Operation 330-3: The UE sends the handover-free UE identifier carried by the UE to the network device by using the transmission resource allocated by the network device to the UE. For example, the UE may send the handover-free UE identifier carried by the UE to a base station by using media access control (MAC) signaling. Optionally, the UE may indicate, by adding a logical channel identifier to the transmission resource, that an uplink data packet sent this time carries the handover-free UE identifier of the UE.

Optionally, when the deactivation condition is that the UE determines, according to a handover-free area identifier broadcast by the current serving cell and the handover-free area identifier stored in the UE, that the UE has moved beyond the handover-free area, that is, when the handover-free area in which the UE is located changes, operation 330-3 may include: sending, by the UE to the network device using the transmission resource, the handover-free UE identifier and the handover-free area identifier of the handover-free area in which the UE is currently located. For example, the UE may send the handover-free UE identifier carried by the UE and the original handover-free area identifier to the network device by using an RRC message.

In operation 340, the UE receives a dedicated intra-cell UE identifier, for example, a C-RNTI, of a current serving cell from the network device, and exits the handover-free state after receiving the dedicated intra-cell UE identifier. The UE may store the handover-free UE identifier and the handover-free area identifier in the handover-free state. The UE needs to obtain the dedicated intra-cell UE identifier according to the handover-free UE identifier or according to the handover-free UE identifier and the handover-free area identifier.

Operation 340 may further include some or all of the following operations. In an embodiment of the present invention, the following steps can be included. Operation 340-1: The UE receives a fed back handover-free UE identifier from the network device according to the received temporary intra-cell UE identifier. Operation 340-2: The UE obtains the dedicated intra-cell UE identifier according to the fed back handover-free UE identifier and the temporary intra-cell UE identifier. Optionally, the UE determines whether the fed back handover-free UE identifier is the same as the handover-free UE identifier sent by the UE. If the two identifiers are the same, the UE uses the temporary intra-cell UE identifier as the dedicated intra-cell UE identifier of the UE. Alternatively, if the two identifiers are different, the UE repeats operations 330-1, 330-2, 330-3, and 340-1, and when the received fed back handover-free UE identifier is the same as the UE identifier sent by the UE in the handover-free area, uses the currently obtained temporary intra-cell UE identifier as the dedicated intra-cell UE identifier.

Optionally, the UE may further receive a resource identifier index from the network device. The resource identifier index is used for receiving, after the UE exits the handover-free state, a resource that is allocated by the network device and that is used for data transmission. The resource identifier index may be received in operation 330-3 or operation 340-1. The resource may include a hybrid automated repeat request (HARQ) feedback resource, a channel state information (CSI) feedback resource, and the like. Optionally, the UE may receive the resource identifier index and corresponding information of specific resource information before operation 340. For example, in the connected state, the UE may receive the resource identifier index and the corresponding information by using a dedicated message such as an RRC re-configuration message.

Alternatively, in the handover-free state, the UE may obtain the resource identifier index and the corresponding information by using a broadcast message. By using operation 340, the UE sends, to the network device, the handover-free UE identifier carried by the UE in the handover-free state, and receives, from the network device, the dedicated intra-cell UE identifier allocated by the network device to the UE. After receiving the dedicated intra-cell UE identifier, the UE exits the handover-free state. Optionally, the mobility management method 300 may further include operation 350. In operation 350, the UE sends data to the network device according to the dedicated intra-cell UE identifier received in operation 340 and the connection context stored in the UE or receives data from the network device according to the dedicated intra-cell UE identifier received in operation 340 and the connection context stored in the UE.

According to one embodiment, the UE in the connected state can enter the handover-free state. In the handover-free state, when the connection context is retained, the UE may not execute the handover procedure when the UE moves in the handover-free area, thereby resolving a problem of frequent handover during movement of the UE. In addition, when there is a need to perform data transmission, the UE can be quickly connected to the network device by obtaining the dedicated intra-cell UE identifier, without requiring completion of an entire data access process, thereby ensuring data transmission efficiency.

Figure 4:
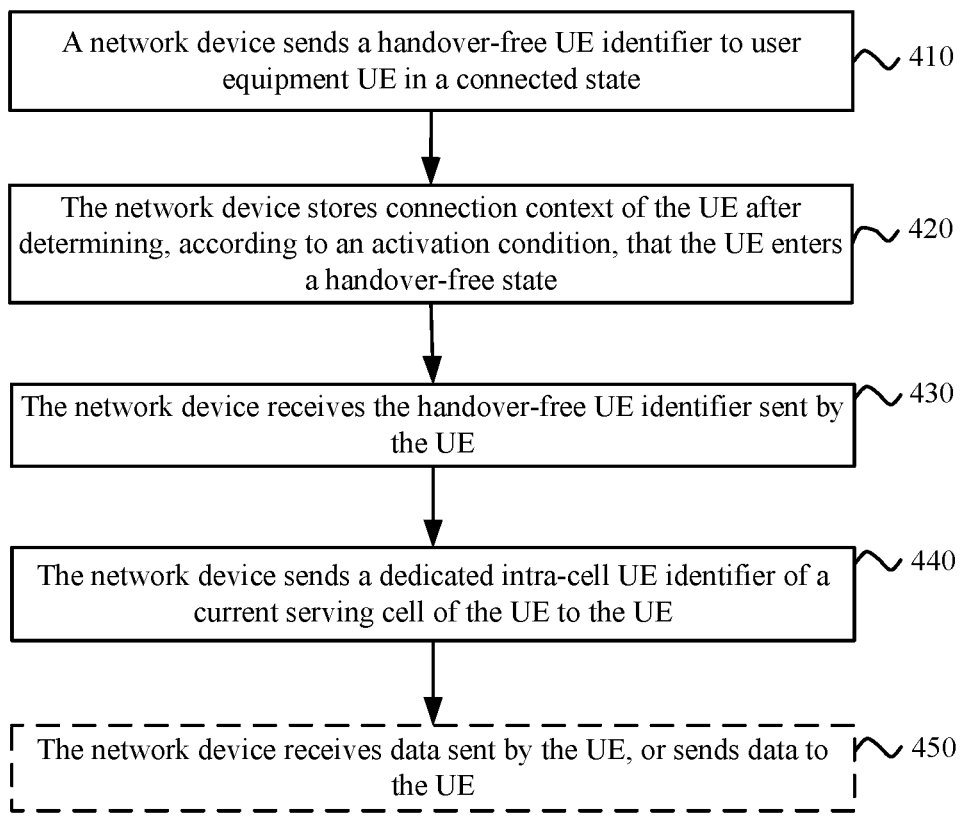
FIG. 4 is a flowchart of a mobility management method according to another embodiment of the present invention.

FIG. 4 is a schematic flowchart of a mobility management method according to an embodiment of the present invention. The method in FIG. 4 may be performed by a network device. Referring to FIG. 4, in operation 410, a network device sends a handover-free UE identifier, for example, an HFA-RNTI, to UE in a connected state, where the handover-free UE identifier is used to uniquely identify UE in a handover-free state in a handover-free area. The handover-free state means that the UE does not execute a handover procedure when the UE moves in the handover-free area, and the handover-free area includes at least two cells.

In operation 420, the network device stores connection context of the UE after determining, according to an activation condition, that the UE enters the handover-free state.

Optionally, in an embodiment, the activation condition includes that the network device sends a command to the UE, where the command is used to instruct the UE to enter the handover-free state. Optionally, in another embodiment, the activation condition includes that the network device has not performed data transmission with the UE within a predefined period of time. For example, a timer may be disposed inside the network device. After sending the handover-free UE identifier HFA-RNTI to the UE, when the network device stops data transmission with the UE, the timer starts timing. If the network device performs data transmission with the UE during timing, the timer stops timing, and restarts timing after completion of the data transmission. If no data transmission is performed before the timer expires, the network device determines, after the timer expires, that the UE enters the handover-free state. The stopping, by the network device, data transmission with the UE includes: sending data to the UE and/or receiving data from the UE.

Each handover-free area has a handover-free area identifier, so that the UE and/or the network device uniquely determine/determines a handover-free area. For definitions of the handover-free state of the UE and the handover-free area, refer to operation 320 in FIG. 3. The network device stores the connection context of the UE after determining, according to the activation condition, that the UE enters the handover-free state. For example, radio resource configuration information of the UE is stored, and a connection that is for the UE and that is between the network device and a core network is retained.

Optionally, when there is a need to page the UE in the handover-free state, the network device determines a handover-free area in which the UE is located. The network device sends a paging message to all cells in the handover-free area. The paging message may carry the handover-free UE identifier, so that the UE determines whether the UE is paged. The network device may page the UE because the network device needs to send downlink data to the UE or another UE calls the UE.

In operation 430, the network device receives the handover-free UE identifier sent by the UE. Optionally, the network device receives the handover-free UE identifier that is sent by the UE after the UE meets a deactivation condition. The deactivation condition is already described in operation 330, and details are not described herein again. Optionally, that the network device receives the handover-free identifier sent by the UE includes some or all of the following several operations. In an embodiment of the present invention, the following operations can be included:

Operation 430-1: The network device receives a random access preamble sent by the UE. The preamble is used to request the network device to allocate a transmission resource and a dedicated intra-cell UE identifier to the UE. Because the preamble is a public resource and several UEs may use a same preamble to send a request to the network device, after receiving the preamble, the network device cannot identify specific UE that sends the preamble.

Operation 430-2: The network device sends the transmission resource and the temporary intra-cell UE identifier to the UE. Because the network device cannot determine the UE that requests the transmission resource and the intra-cell UE identifier, the network device sends the transmission resource and a random intra-cell UE identifier to the UE according to a received UE identifier that is related to a time point at which the UE sends the preamble, so that all UEs that use the preamble can receive information about the transmission resource and the random intra-cell UE identifier. The UE identifier may include the dedicated intra-cell UE identifier and the handover-free UE identifier.

Operation 430-3: The network device receives the handover-free UE identifier that is sent by the UE by using the transmission resource. Because in operation 430-2, the network device may send the transmission resource and the temporary intra-cell UE identifier to multiple UEs, in operation 430-3, the network device may receive handover-free UE identifiers sent by the multiple UEs. Optionally, the network device may further receive the handover-free UE identifier and a handover-free area identifier that are sent by the UE by using the transmission resource.

In operation 440, the network device sends a dedicated intra-cell UE identifier of a current serving cell of the UE to the UE, so that the UE exits the handover-free state after receiving the dedicated intra-cell UE identifier. Optionally, in operation 440, the network device sends a fed back handover-free UE identifier. For example, the network device randomly selects one of multiple received handover-free UE identifiers as the fed back handover-free UE identifier. The dedicated intra-cell UE identifier of the UE is obtained according to the fed back handover-free UE identifier and the temporary intra-cell UE identifier.

Optionally, the network device may further send a resource identifier index to the UE. The resource identifier index is used for receiving, after the UE exits the handover-free state, a resource that is allocated by the network device and that is used for data transmission. The resource identifier index may be received in operation 430-3 or operation 440. The resource may include a HARQ feedback resource, a CSI feedback resource, and the like. Optionally, the network device may receive the resource identifier index and corresponding information of specific resource information before operation 430. For example, in the connected state, the network device may send the resource identifier index and the corresponding information by using a dedicated message such as an RRC re-configuration message. Alternatively, in the handover-free state, the network device may send the resource identifier index and the corresponding information by using a broadcast message.

By using operation 440, the network device receives, from the UE, the handover-free UE identifier carried by the UE in the handover-free state, or receives the handover-free UE identifier and the handover-free area identifier, and allocates the dedicated intra-cell UE identifier to the UE. Optionally, in operation 450, the network device receives, according to the dedicated intra-cell UE identifier and the connection context, data sent by the UE, or sends data to the UE according to the dedicated intra-cell UE identifier and the connection context.

According to one embodiment, after the UE enters the handover-free state, the network device does not need to frequently participate in a handover procedure during movement of the UE, thereby saving communications resources of the network device. When there is a need to perform data communication with the UE, the network device may search for the UE by means of paging, so that the UE can be quickly connected to the network device after obtaining the dedicated intra-cell UE identifier, thereby ensuring data transmission efficiency.

Figure 5:
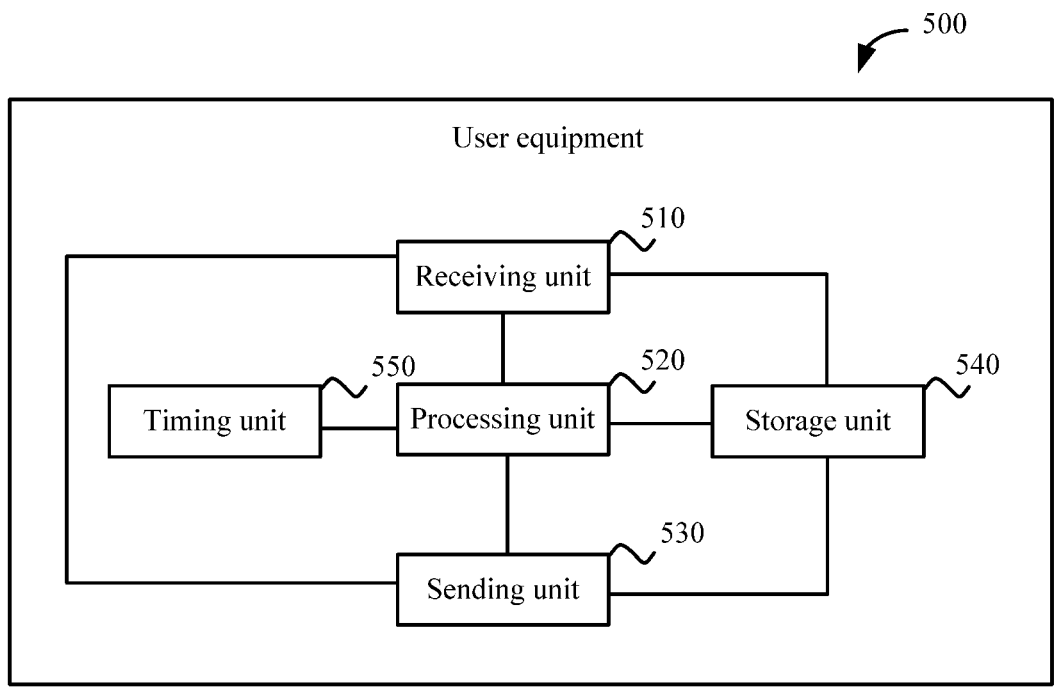
FIG. 5 is a schematic structural diagram of user equipment according to an embodiment of the present invention.

FIG. 5 is a schematic structural diagram of user equipment according to an embodiment of the present invention. The user equipment shown in FIG. 5 includes a receiving unit 510, a processing unit 520, a sending unit 530, a storage unit 540, and a timing unit 550. The receiving unit 510 is configured to receive, in a connected state, a handover-free UE identifier, for example, an HFA-RNTI from a network device, where the handover-free UE identifier is used to uniquely identify UE in a handover-free state in a handover-free area. Optionally, the handover-free area includes at least two cells. The concepts of the handover-free state and the handover-free area are already described in operation 310 and operation 320 in FIG. 3, and details are not further described herein.

The processing unit 520 is configured to switch the UE to the handover-free state after an activation condition is met. In the handover-free state, the UE stores the handover-free UE identifier and connection context that is of the UE in the connected state, and does not execute a handover procedure when the UE moves in the handover-free area. The storage unit 530 is configured to: in the handover-free state of the UE, store the handover-free UE identifier of the UE and the connection context that is of the UE in the connected state.

The processing unit 520 is further configured to determine whether the UE meets a deactivation condition. The receiving unit 510 is further configured to receive a dedicated intra-cell UE identifier of a current serving cell from the network device. The processing unit 520 is further configured to enable the UE to exit the handover-free state after the receiving unit 510 receives the dedicated intra-cell UE identifier.

The sending unit 540 is further configured to send data to the network device according to the dedicated intra-cell UE identifier and the stored connection context of the UE. Optionally, in an embodiment, the activation condition includes that the receiving unit 510 receives a command of the network device, where the command is used to instruct the UE to enter the handover-free state. Optionally, in another embodiment, the user equipment further includes: a timing unit 550, configured to perform timing, to obtain a period of time for which the UE has stopped data transmission with the network device.

The processing unit 520 is further configured to: determine whether the period of time obtained by means of timing is greater than or equal to a predefined time, and when the period of time is greater than or equal to the predefined time, consider that the activation condition is met. Optionally, that the processing unit 520 determines whether the UE meets the deactivation condition includes at least one of the following: the receiving unit 510 receiving a handover-free area identifier sent by the network device, where the handover-free area identifier is used to identify a corresponding handover-free area, and the processing unit determining, according to the handover-free area identifier, that the UE has moved beyond the original handover-free area in which the UE is located; the receiving unit 510 listening to a paging channel, and receiving, according to the handover-free UE identifier, a paging message sent by the network device on the paging channel, and the processing unit determining, according to the paging message, that the UE needs to perform data transmission with the network device; when the processing unit 520 instructs the UE to move between cells in the handover-free area and perform cell reselection according to a cell reselection rule, the processing unit determines that a target serving cell and the current serving cell of the UE are located in different tracking areas; and the sending unit 530 needs to send uplink data.

The sending unit 540 is configured to send the handover-free UE identifier to the network device after the UE determines that the deactivation condition is met. Optionally, in another embodiment, the processing unit 520 is further configured to: in the handover-free state, control the receiving unit 510 and the sending unit 540 to stop using a secondary carrier.

Optionally, in an embodiment, that the sending unit sends the handover-free UE identifier to the network device includes: sending, by the sending unit 540, a preamble to the network device, to request the network device to allocate a transmission resource and the dedicated intra-cell UE identifier to the UE; receiving, by the receiving unit 510, the transmission resource and a temporary intra-cell UE identifier that are allocated by the network device; and sending, by the sending unit 540, the handover-free UE identifier to the network device by using the transmission resource.

Optionally, the operation of the processing unit 520 determining that the deactivation condition is met includes that the receiving unit 510 receives a handover-free area identifier sent by the network device, where the handover-free area identifier is used to identify a corresponding handover-free area, and the processing unit determines, according to the handover-free area identifier, that the UE has moved beyond the original handover-free area in which the UE is located, the sending, by the sending unit 540, the handover-free UE identifier to the network device using the transmission resource includes: sending, by the sending unit 540, the handover-free UE identifier and the handover-free area identifier of the original handover-free area of the UE to the network device by using the transmission resource.

The operation of receiving unit 510 obtaining a dedicated intra-cell UE identifier of a current serving cell from the network device includes: receiving, by the receiving unit 510, a fed back handover-free UE identifier from the network device according to the temporary intra-cell UE identifier; and obtaining, by the processing unit 520, the dedicated intra-cell UE identifier according to the fed back handover-free UE identifier and the temporary intra-cell UE identifier.

The obtaining, by the processing unit 520, the dedicated intra-cell UE identifier according to the fed back handover-free UE identifier and the temporary intra-cell UE identifier includes: determining, by the processing unit 520, whether the fed back handover-free UE identifier is the same as the handover-free UE identifier of the UE that is sent by the UE. If the two identifiers are the same, the temporary intra-cell UE identifier is used as the dedicated intra-cell UE identifier. If the two identifiers are different, the processing unit 520 controls the sending unit 540 and the receiving unit 510 to repeat the operations for sending the preamble to receiving the fed back handover-free UE identifier, and determining again whether the fed back handover-free UE identifier is the same as the handover-free UE identifier of the UE that is sent by the UE. When the fed back handover-free UE identifier is the same as the handover-free UE identifier sent by the UE to the network device, using the obtained temporary intra-cell UE identifier as the dedicated intra-cell UE identifier.

Optionally, in another embodiment, the receiving unit 510 is further configured to: receive a resource identifier index from the network device, and use the resource identifier index to receive, after the UE exits the handover-free state, a resource that is allocated by the network device and that is used for data transmission. The resource may be a HARQ feedback resource and/or a CSI feedback resource.

Figure 6:
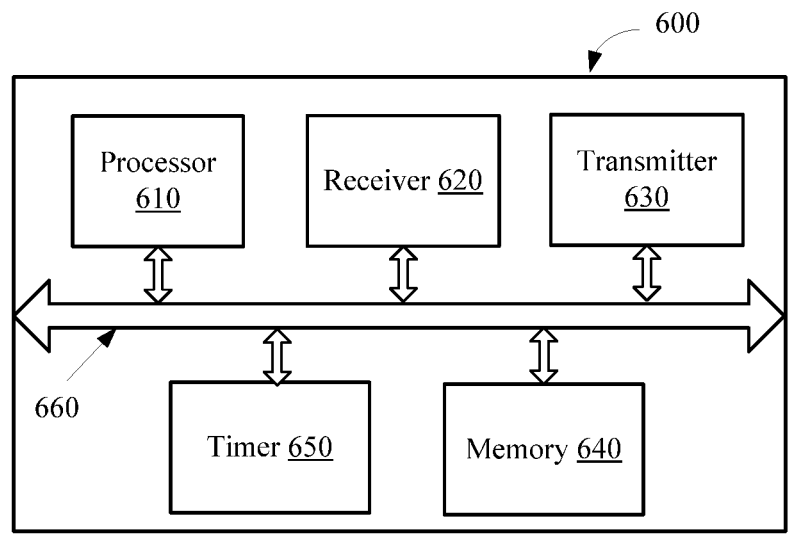
FIG. 6 is a schematic structural diagram of user equipment according to another embodiment of the present invention.

It should be noted that in this embodiment of the present invention, the receiving unit 510 may be implemented by a receiver, the processing unit 520 may be implemented by a processor, the storage unit 530 may be implemented by a memory, and the sending unit 540 may be implemented by a transmitter. As shown in FIG. 6, user equipment 600 may include a processor 610, a receiver 620, a transmitter 630, and a memory 640. The memory 640 may be configured to store code executed by the processor 610. Components of the user equipment 600 are coupled together by using a bus system 660. In addition to a data bus, the bus system 660 further includes a power bus, a control bus, and a status signal bus.

Figure 7:
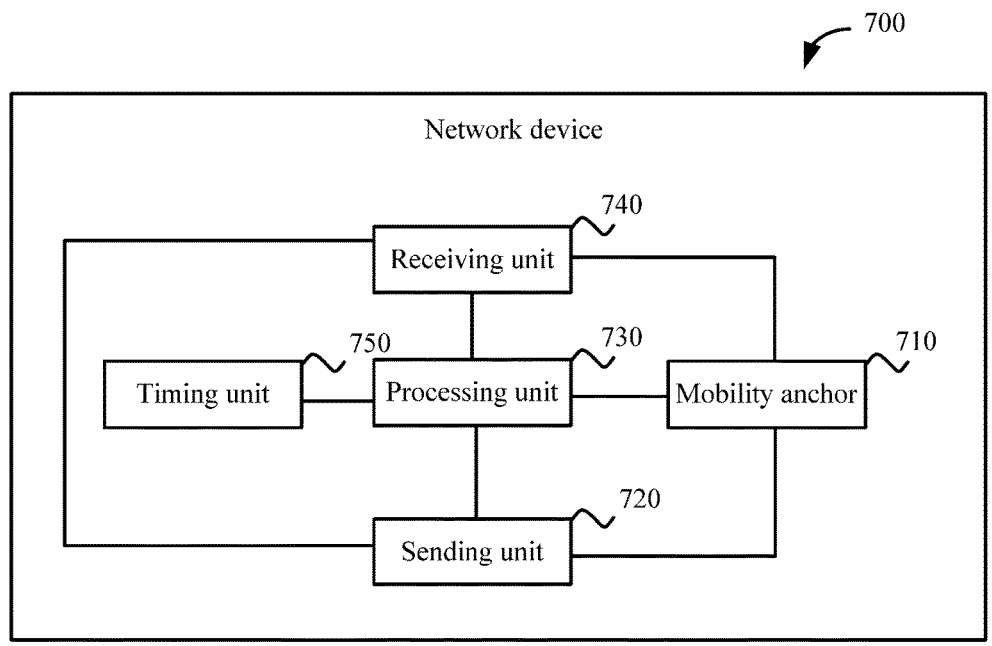
FIG. 7 is a schematic structural diagram of a network device according to an embodiment of the present invention.

FIG. 7 is a schematic structural diagram of a network device according to an embodiment of the present invention. A network device 700 shown in FIG. 7 includes a mobility anchor 710, a sending unit 720, a processing unit 730, a receiving unit 740, and a timing unit 750. The sending unit 720 is configured to send a handover-free UE identifier to user equipment UE in a connected state, where the handover-free UE identifier is used to uniquely identify UE in a handover-free state in a handover-free area. The handover-free state means that the UE does not execute a handover procedure when the UE moves in the handover-free area, and the handover-free area includes at least two cells. The concepts of the handover-free state and the handover-free area are already described in operation 310 and operation 320 in FIG. 3, and details are not further described herein.

The processing unit 730 is configured to determine, according to an activation condition, that the UE enters the handover-free state. The mobility anchor 710 is configured to store connection context of the UE after it is determined that the UE enters the handover-free state. The receiving unit 740 is configured to receive the handover-free UE identifier sent by the UE. The sending unit 720 is further configured to send a dedicated intra-cell UE identifier of a current serving cell of the UE to the UE, so that the UE exits the handover-free state after obtaining the dedicated intra-cell UE identifier.

Optionally, the activation condition includes that the sending unit 720 sends a command to the UE, where the command is used to instruct the UE to enter the handover-free state. Optionally, the network device 700 further includes: a timing unit 750, configured to perform timing, to obtain a period of time for which the sending unit 720 and the receiving unit 740 have stopped data transmission with the UE. The data transmission includes: sending, by the sending unit 720, data to the UE and/or receiving, by the receiving unit 740, data from the UE.

The processing unit 730 is further configured to: determine whether the period of time recorded by the timing unit is greater than or equal to a predefined time; and when the period of time is greater than or equal to the predefined time, determine that the activation condition is met, and enable the UE to enter the handover-free state.

The mobility anchor 710 is further configured to store the connection context of the UE after the UE enters the handover-free state. Optionally, the sending unit 720 is further configured to receive, according to the dedicated intra-cell UE identifier and the connection context, data sent by the UE, or send data to the UE according to the dedicated intra-cell UE identifier and the connection context.

Optionally, that the receiving unit 740 receives the handover-free identifier sent by the UE includes: receiving, by the receiving unit 740, a random access preamble sent by the UE; sending, by the sending unit 720, a transmission resource and a temporary intra-cell UE identifier to the UE; and receiving, by the receiving unit 740, the handover-free UE identifier that is sent by the UE by using the transmission resource.

Optionally, the dedicated intra-cell UE identifier is used to enable the UE to exit the handover-free state. The operation of sending unit 720 sending the dedicated intra-cell UE identifier to the UE includes: sending, by the sending unit 720, a fed back handover-free UE identifier, where the dedicated intra-cell UE identifier is obtained by the UE according to the fed back handover-free UE identifier and the temporary intra-cell UE identifier. Content of obtaining, by the network device 700, the dedicated intra-cell UE identifier according to the handover-free UE identifier is the same as that in operation 430 and operation 440 in FIG. 4, and details are not further described herein.

Optionally, each handover-free area corresponds to a handover-free area identifier. The processing unit 730 uniquely determines the handover-free area according to the handover-free area identifier. The operation of receiving, by the receiving unit 740, the handover-free UE identifier that is sent by the UE using the transmission resource includes: receiving, by the receiving unit 740, the handover-free UE identifier and the handover-free area identifier that are sent by the UE by using the transmission resource.

Optionally, the sending unit 720 sends a resource identifier index to the UE. The resource identifier index is used to allocate a resource that is used for data transmission after the UE enters the connected state. The resource identifier index is already described after operation 440 in FIG. 4, and details are not further described herein.

Optionally, before the mobility anchor 710 configures the handover-free UE identifier for the user equipment UE in the connected state, the following operation is further included: sending, by the processing unit 730, a configuration request to the mobility anchor 710, to request the mobility anchor to configure the handover-free UE identifier for the UE.

The processing unit 730 receives the configured handover-free UE identifier. The sending unit 720 may send the handover-free UE identifier to the UE. Optionally, after the sending, by the sending unit 720, a dedicated intra-cell UE identifier of a current serving cell of the UE to the UE, the following operations are further included: sending, by the processing unit 730, a connection context request message to the mobility anchor; and receiving, by the processing unit 730, the connection context sent by the mobility anchor.

It should be understood that in an embodiment, the mobility anchor 710 may implement a function of the processing unit 730, or the processing unit 730 may implement a function of the mobility anchor 710. That is, the functions of the mobility anchor 710 and the processing unit 730 may be separately implemented by the two units or may be independently implemented by either of the two units.

According to one embodiment, after the UE enters the handover-free state, the network device does not need to frequently participate in a handover procedure during movement of the UE, thereby saving communications resources of the network device. When there is a need to perform data communication with the UE, the network device may search for the UE via paging, so that the UE can be quickly connected to the network device after obtaining the dedicated intra-cell UE identifier, thereby ensuring data transmission efficiency.

Optionally, in this embodiment of the present invention, the sending unit 720 may be implemented as a part of a transmitter, the processing unit 730 may be implemented as a part of a processor, the receiving unit 740 may be implemented as a part of a receiver, and the timing unit 750 may be implemented as a timer.

Figure 8:
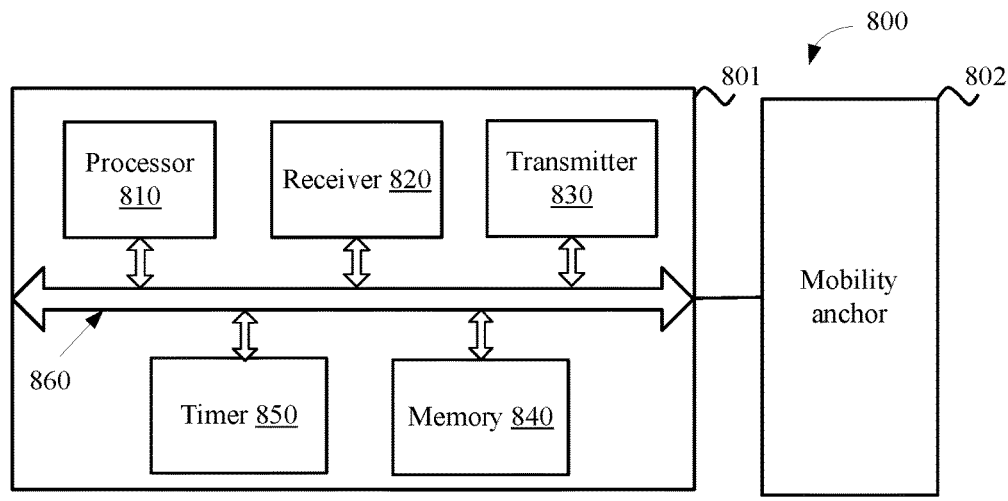
FIG. 8 is a schematic structural diagram of a network device according to another embodiment of the present invention.

FIG. 8 is a schematic structural diagram of a network device according to one embodiment. As shown in FIG. 8, a network device 800 may include a base station 801 and a mobility anchor 802. The base station 801 may include a processor 810, a receiver 820, a transmitter 830, a memory 840, and a timer 850. The memory 840 may be configured to store code executed by the processor 810, and the like. Components of the base station 801 are coupled together by using a bus system 860. In addition to a data bus, the bus system 860 further includes a power bus, a control bus, and/or a status signal bus.

Figure 9:
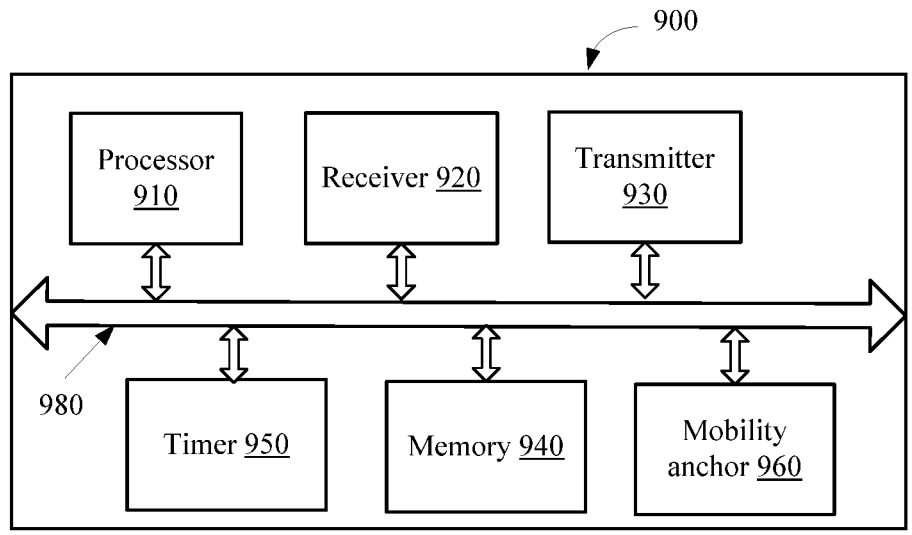
FIG. 9 is a schematic structural diagram of a network device according to another embodiment of the present invention.

FIG. 9 is another schematic structural diagram of a network device according to one embodiment. FIG. 9 is described with reference to FIG. 1. As shown in FIG. 9, a base station 900 may include a processor 910, a receiver 920, a transmitter 930, a memory 940, a timer 950, and a mobility anchor 960. The memory 940 may be configured to store code executed by the processor 910, and the like. Components of the base station 900 are coupled together using a bus system 980. In addition to a data bus, the bus system 980 further includes a power bus, a control bus, and a status signal bus.

Figure 10:
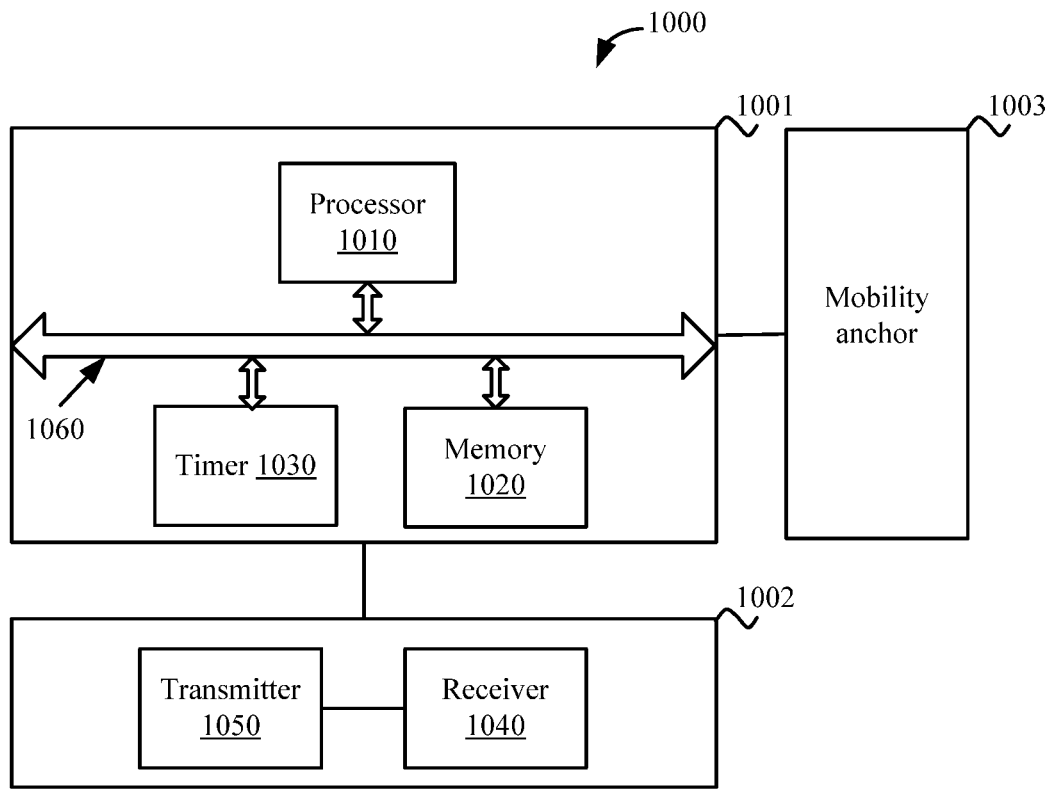
FIG. 10 is a schematic structural diagram of a network device according to another embodiment of the present invention.

FIG. 10 is another schematic structural diagram of a network device according to another embodiment. As shown in FIG. 10, a network device 1000 includes a baseband 1001, a radio frequency group 1002, and a mobility anchor 1003. The baseband 1001 may include a processor 1010, a memory 1020, and a timer 1030. The memory 1020 may be configured to store code executed by the processor 1010, and the like. The radio frequency group 1002 may include a receiver 1040 and a transmitter 1050. Components of the baseband 1001 are coupled together by using a bus system 1060. In addition to a data bus, the bus system 1060 further includes a power bus, a control bus, and a status signal bus.

Figure 11:
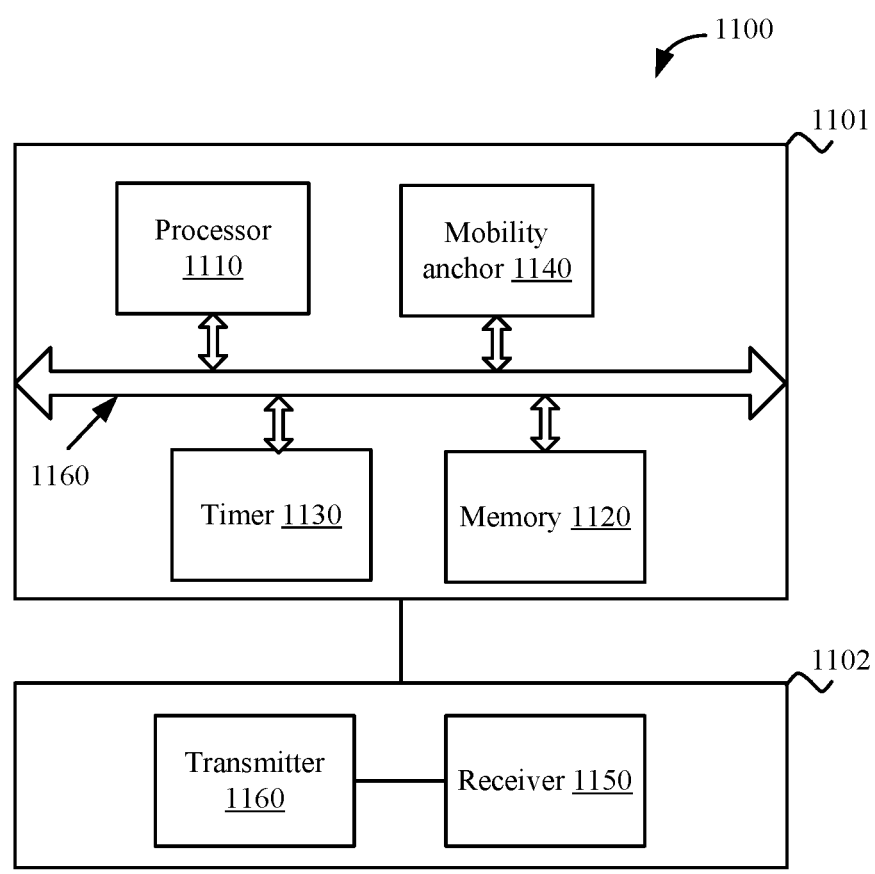
FIG. 11 is a schematic structural diagram of a network device according to another embodiment of the present invention.

FIG. 11 is another schematic structural diagram of a network device according to another embodiment. As shown in FIG. 11, a network device 1100 includes a baseband 1101 and a radio frequency group 1102. The baseband 1101 may include a processor 1110, a memory 1120, a timer 1130, and a mobility anchor 1140. The memory 1120 may be configured to store code executed by the processor 1110, and the like. Components of the baseband 1101 are coupled together by using a bus system 1160. In addition to a data bus, the bus system 1160 further includes a power bus, a control bus, and a status signal bus. The radio frequency group 1102 may include a transmitter 1160 and a receiver 1150.

It should be noted that the foregoing method embodiments of the present invention may be applied to a processor, or implemented by a processor. The processor may be an integrated circuit chip and has a signal processing capability. In an implementation process, operations in the foregoing method embodiments can be implemented by using a hardware integrated logical circuit in the processor, or by using instructions in a form of software. The processor may be a general purpose processor, a digital signal processor (Digital Signal Processor, DSP), an application-specific integrated circuit (ASIC), a field programmable gate array (FPGA) or another programmable logical device, a discrete gate or transistor logic device, or a discrete hardware component. The processor may implement or perform the methods, the operations, and logical schematic diagrams that are disclosed in the embodiments of the present invention. The general purpose processor may be a microprocessor or the processor may be any conventional processor, or the like. Operations and/or steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations and/or steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions or embodiments of the present invention may be implemented in a form of a software product. The software product is stored in a storage medium, and includes instructions for instructing a computer device (which may be a personal computer, a server, or a network device) to perform all or some of the operations and/or steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of embodiments of the present invention, but are not intended to limit the protection scope of embodiments of the present invention. Any variation or replacement readily figured out by a person skilled in the art within the technical scope disclosed in embodiments of the present invention shall fall within the protection scope of embodiments of the present invention. Therefore, the protection scope of embodiments of the present invention shall be subject to the protection scope of the claims.

What is claimed is:

1. A data transmission method, comprising:
   receiving, by user equipment (UE) in a connected state, a handover-free UE identifier from a network device, wherein the handover-free UE identifier is used to uniquely identify the UE in a handover-free state in a handover-free area, and the handover-free area comprises at least two cells;
   entering, by the UE, the handover-free state after meeting an activation condition, wherein in the handover-free state, the UE stores the handover-free UE identifier and a connection context that is of the UE in the connected state, and the UE does not execute a handover procedure when the UE moves in the handover-free area;
   sending, by the UE, the handover-free UE identifier to the network device after the UE determines that a deactivation condition is met;
   obtaining, by the UE, a dedicated intra-cell UE identifier of a current serving cell from the network device; and
   exiting, by the UE, the handover-free state.

2. The method according to claim 1, further comprising: sending, by the UE, data to the network device according to the dedicated intra-cell UE identifier and the connection context, or receiving data from the network device according to the dedicated intra-cell UE identifier and the connection context.

3. The method according to claim 1, wherein the UE determining that a deactivation condition is met comprises at least one of the following:
   the UE receiving a handover-free area identifier sent by the network device, wherein the handover-free area identifier is used to identify a corresponding handover-free area, and the UE determining, according to the handover-free area identifier, that the UE has moved beyond an original handover-free area in which the UE is located;
   the UE listening to a paging channel, and receiving, according to the handover-free UE identifier, a paging message sent by the network device on the paging channel, and the UE determining, according to the paging message, that the UE needs to perform a data transmission with the network device;

a target serving cell and the current serving cell of the UE being located in different tracking areas when the UE moves between cells in the handover-free area and performing cell reselection according to a cell reselection rule; or the UE requiring to send uplink data.

4. The method according to claim 3, wherein the sending, by the UE, the handover-free UE identifier to the network device comprises:
   sending, by the UE, a random access preamble to the network device;
   receiving, by the UE, a transmission resource and a temporary intra-cell UE identifier that are allocated by the network device;
   sending, by the UE, the handover-free UE identifier to the network device using the transmission resource; and
   the obtaining, by the UE, a dedicated intra-cell UE identifier of a current serving cell from the network device, wherein obtaining a dedicated intra-cell UE identifier comprises:
      receiving, by the UE, a fed back handover-free UE identifier from the network device according to the temporary intra-cell UE identifier; and
      obtaining, by the UE, the dedicated intra-cell UE identifier according to the fed back handover-free UE identifier and the temporary intra-cell UE identifier.

5. The method according to claim 4, wherein the UE determining that a deactivation condition is met comprises:
   the UE receiving a handover-free area identifier sent by the network device, wherein the handover-free area identifier is used to identify a corresponding handover-free area; and
   the UE determining, according to the handover-free area identifier, that the UE has moved beyond the original handover-free area in which the UE is located,
   wherein the sending, by the UE, the handover-free UE identifier to the network device by using the transmission resource comprises sending, by the UE, the handover-free UE identifier and a handover-free area identifier of the original handover-free area of the UE to the network device using the transmission resource.

6. The method according to claim 4, wherein the obtaining, by the UE, the dedicated intra-cell UE identifier according to the fed back handover-free UE identifier and the temporary intra-cell UE identifier comprises:
   determining, by the UE, whether the fed back handover-free UE identifier is the same as the handover-free UE identifier of the UE that is sent by the UE;
   if the fed back handover-free UE identifier and the handover-free UE identifier are the same, using the temporary intra-cell UE identifier as a dedicated intra-cell UE identifier;
   if the fed back handover-free UE identifier and the handover-free UE identifier are different, repeating the operation of sending a random access preamble to the network device until a fed back handover-free UE identifier is received from the network device;
   determining again whether the fed back handover-free UE identifier is the same as the handover-free UE identifier of the UE that is sent by the UE; and
   when the fed back handover-free UE identifier is the same as the handover-free UE identifier sent by the UE to the network device, using the obtained temporary intra-cell UE identifier as the dedicated intra-cell UE identifier.

7. The method according to claim 1, further comprising:
   receiving, by the UE, a resource identifier index from the network device, wherein the resource identifier index is used for receiving, after the UE exits the handover-free state, a resource that is allocated by the network device and that is used for data transmission.

8. User equipment (UE), comprising:
   a receiver, configured to receive a handover-free UE identifier from a network device when the UE is in a connected state, wherein the handover-free UE identifier is used to uniquely identify UE in a handover-free state in a handover-free area, and the handover-free area comprises at least two cells;
   a processor, configured to instruct, after an activation condition is met, the UE to enter the handover-free state, wherein in the handover-free state, the UE does not execute a handover procedure when the UE moves in the handover-free area;
   a memory, configured to: in the handover-free state of the UE, store the handover-free UE identifier of the UE and a connection context that is of the UE in the connected state; and
   a transmitter, configured to send the handover-free UE identifier to the network device after the UE meets a deactivation condition, wherein the receiver is further configured to obtain a dedicated intra-cell UE identifier of a current serving cell from the network device, and the processor is further configured to enable the UE to exit the handover-free state after the dedicated intra-cell UE identifier is received.

9. The user equipment according to claim 8, wherein
   the transmitter is further configured to send data to the network device according to the dedicated intra-cell UE identifier and the connection context; or
   the receiver is further configured to receive data from the network device according to the dedicated intra-cell UE identifier and the connection context.

10. The user equipment according to claim 8, wherein the UE meeting a deactivation condition comprises at least one of the following:
   the receiver receiving a handover-free area identifier sent by the network device, wherein the handover-free area identifier is used to identify a corresponding handover-free area, and the processor determining, according to the handover-free area identifier, that the UE has moved beyond an original handover-free area in which the UE is located;
   the receiver listening to a paging channel, and receiving, according to the handover-free UE identifier, a paging message sent by the network device on the paging channel, and the processor determining, according to the paging message, that the UE requiring to perform a data transmission with the network device;
   when the processor instructs the UE to move between cells in the handover-free area and perform cell reselection according to a cell reselection rule, the processor determines that a target serving cell and the current serving cell of the UE are located in different tracking areas; or
   the transmitter requiring to send uplink data.

11. The user equipment according to claim 10, wherein the transmitter sending the handover-free UE identifier to the network device comprises:
   sending, by the transmitter, a random access preamble to the network device;
   receiving, by the receiver, a transmission resource and a temporary intra-cell UE identifier that are allocated by the network device; and sending, by the transmitter, the handover-free UE identifier to the network device using the transmission resource, wherein the receiver obtaining a dedicated intra-cell UE identifier of a current serving cell from the network device comprises:

receiving, by the receiver, a fed back handover-free UE identifier from the network device according to the temporary intra-cell UE identifier; and obtaining, by the processor, the dedicated intra-cell UE identifier according to the fed back handover-free UE identifier and the temporary intra-cell UE identifier.

12. The user equipment according to claim 10, wherein determining that the UE meets a deactivation condition comprises determining that the receiver receives a handover-free area identifier sent by the network device, wherein the handover-free area identifier is used to identify a corresponding handover-free area; and the processor determines, according to the handover-free area identifier, that the UE has moved beyond the original handover-free area in which the UE is located, wherein the transmitter sends the handover-free UE identifier to the network device using the transmission resource comprises sending, by the transmitter, the handover-free UE identifier and a handover-free area identifier of the original handover-free area of the UE to the network device by using the transmission resource.

13. The user equipment according to claim 12, wherein the obtaining, by the processor, the dedicated intra-cell UE identifier according to the fed back handover-free UE identifier and the temporary intra-cell UE identifier comprises:

determining, by the processor, whether the fed back handover-free UE identifier is the same as the handover-free UE identifier of the UE that is sent by the UE;

if the fed back handover-free UE identifier and the handover-free UE identifier are the same, using the temporary intra-cell UE identifier as the dedicated intra-cell UE identifier;

if the fed back handover-free UE identifier and the handover-free UE identifier are different, controlling, by the processor, the transmitter and the receiver to iteratively performing operations of sending a random access preamble to the network device until a fed back handover-free UE identifier is received from the network device;

determining again whether the fed back handover-free UE identifier is the same as the handover-free UE identifier of the UE that is sent by the UE; and when the fed back handover-free UE identifier is the same as the handover-free UE identifier sent by the UE to the network device, using the obtained temporary intra-cell UE identifier as the dedicated intra-cell UE identifier.

14. The user equipment according to claim 8, wherein the receiver is further configured to: receive a resource identifier index from the network device, and use the resource identifier index to receive, after the UE exits the handover-free state, a resource that is allocated by the network device and that is used for data transmission.

15. A network device, comprising:

a transmitter, configured to send a handover-free user equipment (UE) identifier to UE in a connected state, wherein the handover-free UE identifier is used to uniquely identify the UE in a handover-free state in a handover-free area, wherein the handover-free state means that the UE does not execute a handover procedure when the UE moves in the handover-free area, and the handover-free area comprises at least two cells;

a processor, configured to determine, according to an activation condition, that the UE has entered the handover-free state;

a mobility anchor, configured to store a connection context of the UE after it is determined that the UE has entered the handover-free state; and a receiver, configured to receive the handover-free UE identifier sent by the UE, wherein the transmitter is further configured to send a dedicated intra-cell UE identifier of a current serving cell of the UE to the UE, so that the UE exits the handover-free state after obtaining the dedicated intra-cell UE identifier.

16. The network device according to claim 15, wherein the receiver is further configured to receive, according to the dedicated intra-cell UE identifier and the connection context, data sent by the UE; or the transmitter is further configured to send data to the UE according to the dedicated intra-cell UE identifier and the connection context.

17. The network device according to claim 15, further comprising:

a timer, configured to perform timing, to obtain a period of time for which the network device has stopped data transmission with the UE, wherein the processor is further configured to determine whether the period of time is greater than or equal to a predefined time, and when the period of time is greater than or equal to the predefined time, consider that the activation condition is met.

18. The network device according to claim 15, wherein the receiver receiving the handover-free UE identifier sent by the UE comprises:

receiving, by the receiver, a random access preamble sent by the UE;

sending, by the transmitter, a transmission resource and a temporary intra-cell UE identifier to the UE; and receiving, by the receiver, the handover-free UE identifier that is sent by the UE by using the transmission resource, wherein the transmitter sends the dedicated intra-cell UE identifier to the UE comprises sending, by the transmitter, a fed back handover-free UE identifier.

19. The network device according to claim 18, wherein the transmitter sends a handover-free area identifier to the UE, wherein the handover-free area identifier is used to identify a corresponding handover-free area; and the receiver receives the handover-free UE identifier that is sent by the UE by using the transmission resource, including: receiving, by the receiver, the handover-free UE identifier and the handover-free area identifier that are sent by the UE by using the transmission resource.

20. The network device according to claim 15, wherein the transmitter sends a resource identifier index to the UE, wherein the resource identifier index is used to allocate a resource that is used for data transmission after the UE has entered the connected state.

* * * * *